United States Patent [19]
Howe

[11] 4,086,043
[45] Apr. 25, 1978

[54] ROTOR WITH PLASTIC SHEATHING
[75] Inventor: Frank D. Howe, Painted Post, N.Y.
[73] Assignee: Ingersoll-Rand Company, Woodcliff Lake, N.J.
[21] Appl. No.: 755,456
[22] Filed: Dec. 30, 1976
[51] Int. Cl.² .................. F01C 21/08; F03C 3/00; F04C 15/00; B29C 27/00
[52] U.S. Cl. .................. 418/152; 418/178; 428/419
[58] Field of Search ............... 418/152, 153, 178, 179; 29/527.1; 428/419

[56] References Cited
U.S. PATENT DOCUMENTS

| 1,021,180 | 3/1912 | Clifton | 418/179 |
| 2,174,306 | 9/1939 | Bassett | 418/178 |
| 2,383,194 | 8/1945 | Hoopes | 418/153 |
| 2,833,224 | 5/1958 | Meyer et al. | 418/153 |
| 2,848,952 | 8/1958 | Wakeman | 418/153 |
| 3,198,120 | 8/1965 | Little, Jr. | 418/153 |
| 3,470,791 | 10/1969 | Ovretveit | 418/152 |
| 3,558,246 | 1/1971 | Philipp | 418/178 |
| 3,968,289 | 7/1976 | Higbee | 428/411 |

Primary Examiner—John J. Vrablik
Attorney, Agent, or Firm—Bernard J. Murphy

[57] ABSTRACT

The rotor, in the embodiment depicted, comprises a rotor blank having a hub with at least one radially extending tooth, the rotor being sheathed in plastic, excepting for the hub surface areas. Throughgoing bores formed in the blank receive plugs or dowels of the plastic to secure the sheathing in place. Additionally, the periphery of the blank has an inwardly-widening groove formed therein to fix plastic sheathing also on the periphery. The rotor is formed of steel, and the plastic sheathing has a coefficient of expansion which is the same as that of the steel.

7 Claims, 3 Drawing Figures

ROTOR WITH PLASTIC SHEATHING

This invention pertains to rotors, such as are used in rotary, positive-displacement fluid machines, for example, gas compressors, expanders, engines, and the like, and in particular to rotors of the type noted having abradable or yieldable coatings.

Abradable or yieldable coatings are employed on rotors in order to prevent contacting engagement of the base metal of the rotor with the base metal of a coacting rotor and/or an enveloping wall, and to provide for a "wearing-in", optimum, fully circumferential interengagement of the rotors. Rotors of this type are well known, however these prior art types are subject to early failure, due largely to the separation of the coating from the base metal. Additionally, abradable coatings "wear-in" to an optimum running clearance after the rotor has been operated over a time span and been subjected to incident thermal growth: of the rotor, its coating rotor (if any), the enveloping or interfacing wall, and the coating itself. However, the high temperature running clearance, when the fluid machine is decelerated or being started up, is excessive. Plastic coatings, for having a desirable resilience, are preferable; the plastic is more complementary to and accommodating of "cold" and "hot" running clearances. The problem with plastic coatings, however, is in securing the same onto the rotor blank so that it will not separate therefrom under the influence of centrifugal force. The problem is especially compounded due to the plastic and the base metal of the rotor blank having diverse coefficients of expansion.

It is an object of this invention to set forth an improved, plastic-sheathed rotor. Particularly it is an object of this invention to disclose a plastic-sheathed rotor which avoids the problems inherent in the prior art types. My invention further has as its object the disclosure of a rotor, for use in a rotary, positive-displacement fluid machine, comprising a rotor blank having a hub, and at least one radial tooth extending from said hub; said hub having a given thickness; said tooth having another thickness which is less than said given thickness; said given and another thicknesses define in said blank, on opposite sides of said tooth, a pair of recessed lands; and a sheathing of plastic, fixed on said lands, and therebetween in traverse of said blank, having surfaces which are substantially coplanar with surfaces of said hub.

Further objects of this invention, as well as the novel features thereof, will become more apparent by reference to the following description taken in conjunction with the accompanying figures, in which.

Figure 1:
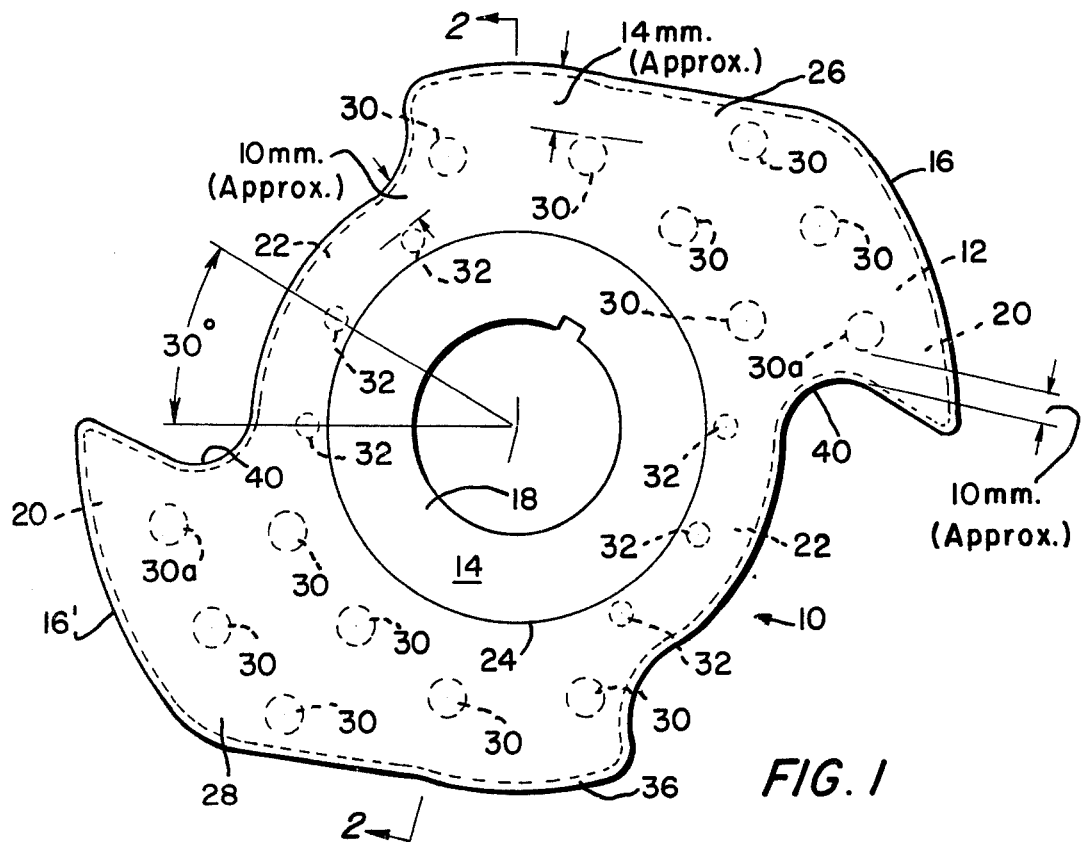
FIG. 1 is a side elevational view of an embodiment of a rotor according to the invention.
Figure 2:
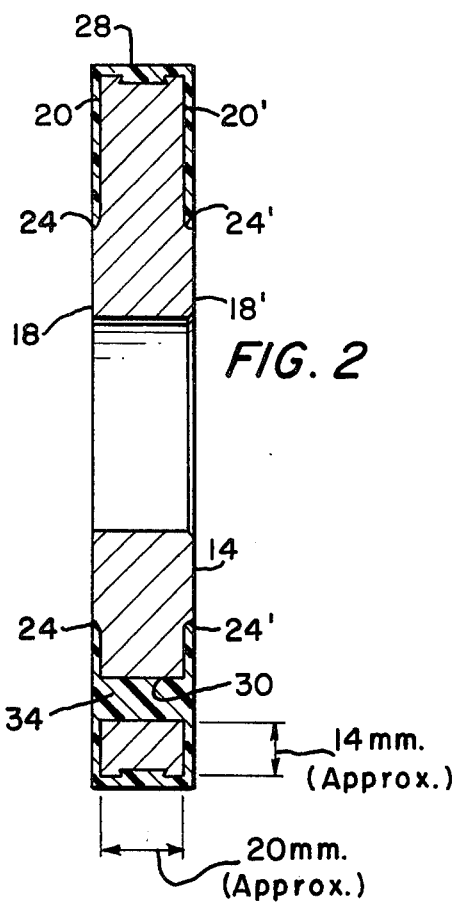
FIG. 2 is a cross-sectional view taken along section 2—2 of FIG. 1.
Figure 3:
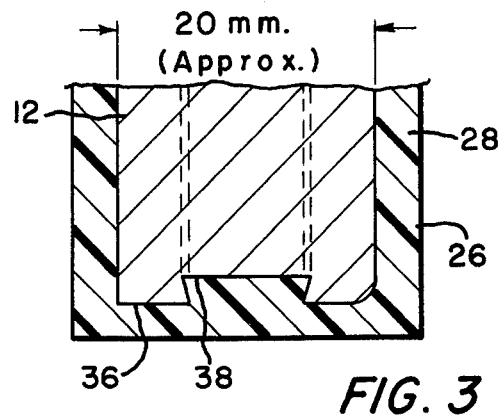
FIG. 3 is an illustration of a fragment of the rotor of FIGS. 1 and 2, the same being of substantially twice the scale of FIGS. 1 and 2, showing the peripheral locking of the plastic sheathing.

As shown in the Figures, an embodiment of the novel rotor 10 comprises a rotor blank 12 which has a hub 14, and a pair of oppositely disposed, radially extending teeth 16 and 16'. The hub 14 comprises a pair of raised circular bosses 18 and 18', whereas the teeth 16 and 16' have recessed lands 20 and 20'. Too, a pair of circumscribing lands 22 and 22', contiguous with the teeth lands 20 and 20', envelope the hub 14 and define therewith a pair of circular shoulders 24 and 24'.

Plastic 26, i.e., polyphenylene sulfide, is molded onto the rotor 10, the same forming a coating sheath 28 on the lands 20, 20', 22 and 22'. In order to hold the sheath 28 onto the lands, the blank 12 has a plurality of throughgoing boreholes 30 and 32 formed therein. Upon the plastic 26 being molded onto the blank 12, it migrates into the boreholes 30 and 32 and form plugs or dowels 34 which lock the sheath 28 in place.

The periphery 36 of the rotor 10 also has the plastic 26 overlaid thereon. Here, to hold the plastic secure, the rotor has a dove-tail-shaped groove 38 formed therein. Hence, the plastic 26 moves into the widened portion of the groove 38 to form an integral and fully circumferential key-lock thereof of the peripherally-molded plastic. In turn, of course, the peripheral plastic is "tied" onto the blank 12 through its contiguity with the lands-disposed plastic sheathing.

By way of example, this embodiment of the novel rotor 10 has peripheral thickness (depth) of 20 20 mm. Accordingly, to enhance the retention of the peripherally-deposited plastic 26, the radially outermost boreholes 30 and 32 are formed in near adjacency to the periphery 36; said boreholes are within less than 20 mm of the periphery 36. In practice, rotor sizes, depth and overall dimensions, will vary with differing requirements. However, it is a teaching of my invention to have the outermost plug or dowel-receiving boreholes 30 and 32 within a distance from the rotor periphery which is less than the width (thickness or depth) of the periphery. Too, the outermost boreholes 30 and 32 should not be spaced apart, circumferentially or circularly, from another thereof more than 30° of arc.

The rotor 10 depicted comprises teeth 16 and 16' having common profiles each of which defines a concavity 40. There is somewhat more of a tendency for plastic 26 overlying the concavity 40 to separate therefrom. For this reason I form a borehole 30a in close adjacency to the concavity 40; borehole 30a is within a distance from the concavity which is not more than half the thickness of the periphery 36, i.e.: 10 mm.

My novel rotor 10 will be found to be a significant improvement over prior art rotors, whatever plastic is used in the sheathing thereof. However, it is a teaching of my invention to employ polyphenylene sulfide as the plastic sheath 28, in that this material has a coefficient of expansion which is the same as that of the steel blank 12 and, thus, the problems attending the use of materials having diverse coefficients of expansion are avoided.

While I have described my invention in connection with specific embodiments thereof, it is to be clearly understood that this is done only by way of example and not as a limitation to the scope of my invention as set forth in the objects thereof and in the appended claims.

I claim:

1. A rotor, for use in a rotary, positive-displacement fluid machine, comprising:

a rotor blank having a hub, and at least one radial tooth extending from said hub;

said hub having a given thickness;

said tooth having another thickness which is less than said given thickness;

said given and another thicknesses define in said blank, on opposite sides of said tooth, a pair of recessed lands; and a sheathing of plastic, fixed on said lands, and therebetween in traverse of said blank, having surfaces which are substantially co-planar with surfaces of said hub; wherein said blank is formed of a given material other than plastic having a prescribed coefficient of expansion;

said sheathing has a coefficient of expansion which is substantially equal to said prescribed coefficient of expansion;

said blank has a single, continuous groove formed in and fully along the outermost peripheral surface thereof;

said groove being of reentrant configuration, having a wider inner than outer dimension; and wherein said sheathing further overlies said periphery, and is nestedly locked in said groove.

2. A rotor, according to claim 1, wherein:
said recess is of dove-tail shape, in cross-section;
said blank has a plurality of throughgoing bores which open onto said lands; and
said sheathing is fixed on said lands by plugs or dowels of said plastic which are formed in said bores and which are integral with said sheathing.

3. A rotor, according to claim 2, wherein:
said blank has a plurality of radial teeth;
said hub is defined as a pair of circular, raised and opposed bosses;
each of said teeth of said plurality thereof being of said another thickness and defining in said blank, on opposite sides of said teeth, pairs of recessed lands; and circumscribing lands, contiguous and co-planar with said recessed lands, and in envelopment of said bosses, formed in said blank on opposite sides thereof.

4. A rotor, according to claim 3, wherein:
said sheathing is fixed on said circumscribing lands.

5. A rotor, according to claim 4, wherein:
said sheathing is formed of polyphenylene sulfide.

6. A rotor, according to claim 2, wherein:
said blank has given ones of said bores formed in relatively radial adjacency to said peripheral surface, and other ones thereof relatively radially spaced inwardly of said given bores;
said peripheral surface has a prescribed, transverse dimension; and
said given bores, having said plugs or dowels formed therein, are all within a distance from said peripheral surface which is less than said transverse dimension.

7. A rotor, according to claim 6, wherein:
said tooth has a profile which defines a concavity in said blank; and
at least one of said bores, having one of said plugs or dowels formed therein, is spaced apart from said concavity a distance of not more than half said transverse dimension.

* * * * *